(12) United States Patent
Mensch et al.

(10) Patent No.: US 11,593,526 B1
(45) Date of Patent: Feb. 28, 2023

(54) SYSTEMS AND METHODS FOR AUTHENTICATING COMPONENTS ON AN ELECTRONIC DEVICE

(71) Applicant: Apple Inc., Cupertino, CA (US)

(72) Inventors: Thomas Philip Mensch, Sunnyvale, CA (US); John Thomas Perry, Santa Clara, CA (US); Yiqun Zhu, Shanghai (CN); Jerrold Hauck, Windermere, FL (US); Peter Chang, Santa Clara, CA (US); Tiffany Shih-Yu Fang, Taipei (TW)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 17/005,145

(22) Filed: Aug. 27, 2020

Related U.S. Application Data

(60) Provisional application No. 62/904,513, filed on Sep. 23, 2019, provisional application No. 62/893,141, filed on Aug. 28, 2019.

(51) Int. Cl.
*G06F 1/26* (2006.01)
*G06F 21/70* (2013.01)

(52) U.S. Cl.
CPC .................................. *G06F 21/70* (2013.01)

(58) Field of Classification Search
CPC .............................. G06F 21/70; G06F 21/00
See application file for complete search history.

(56) References Cited

U.S. PATENT DOCUMENTS

| | | | | |
|---|---|---|---|---|
| 8,875,280 B2* | 10/2014 | Dang | ...................... | G06F 21/70 726/17 |
| 2010/0082961 A1* | 4/2010 | Gurumoorthy | ......... | G06F 21/88 726/34 |
| 2013/0097694 A1* | 4/2013 | Dang | ...................... | G06F 21/00 726/17 |
| 2014/0066192 A1* | 3/2014 | Hollis | ................. | G07F 17/3241 463/29 |
| 2016/0085995 A1* | 3/2016 | Poornachandran | ..... | G06F 21/55 726/34 |

* cited by examiner

*Primary Examiner* — Baotran N To
(74) *Attorney, Agent, or Firm* — Kubota & Basol LLP

(57) ABSTRACT

In some examples, a method comprises determining, at an electronic device having a first component of a first component type, a unique identifier associated with the first component. In some examples, in accordance with a determination that the unique identifier does not match the expected identifier of the component of the first component type in the electronic device, determining that the first component associated with the unique identifier satisfies one or more eligibility criteria. In some examples, in accordance with the determination that the first component associated with the unique identifier satisfies the one or more eligibility criteria, authenticating an association of the first component with the electronic device, including updating an installation counter associated with the first component, and updating the expected identifier for the component of the first type based on the unique identifier of the first component.

36 Claims, 5 Drawing Sheets

SYSTEMS AND METHODS FOR AUTHENTICATING COMPONENTS ON AN ELECTRONIC DEVICE

CROSS REFERENCE TO RELATED APPLICATIONS

This application claims the benefit of U.S. Provisional Patent Application No. 62/904,513, filed Sep. 23, 2019, and U.S. Provisional Patent Application No. 62/893,141, filed Aug. 28, 2019, the contents of all of which are hereby incorporated by reference in their entireties for all purposes.

FIELD OF THE DISCLOSURE

This relates generally to authenticating components installed in an electronic device with the electronic device.

BACKGROUND OF THE DISCLOSURE

An electronic device includes any number of installed hardware components. Certain installed components of the electronic device can be replaced, such as a battery or a display. Replacement of these components can cause damage to the components, thus increasing the chance of failure during the future operation of the device. The act of handling a component and installation can inherently cause components to deteriorate or can introduce risk of damage to the components. Accordingly, it may be necessary to monitor the amount of times a particular component has been installed into devices to ensure that the risk of damage to the components are not above an acceptable tolerance threshold.

SUMMARY OF THE DISCLOSURE

Monitoring the number of installations that a component has been subjected to can advantageously be used to determine whether the risk of damage to the respective component is above a certain tolerance threshold. In some examples, the electronic device can determine that a hardware component has been installed or replaced. In some examples, a global installation counter can be queried to determine whether the newly installed component is authorized to be installed or whether the newly installed component has been installed more times than is permitted and is thus not authorized to be installed. Depending on the global installation counter, the electronic device can respond appropriately to the installed hardware component.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Monitoring the number of installations that a component has been subjected to can advantageously be used to determine whether the risk of damage to the respective component is above a certain tolerance threshold. In some examples, the electronic device can determine that an installed component has been installed or replaced. In some examples, a global installation counter can be queried to determine whether the newly installed component is authorized to be installed or whether the newly installed component has been installed more times than is permitted and is thus not authorized to be installed.

Figure 1:
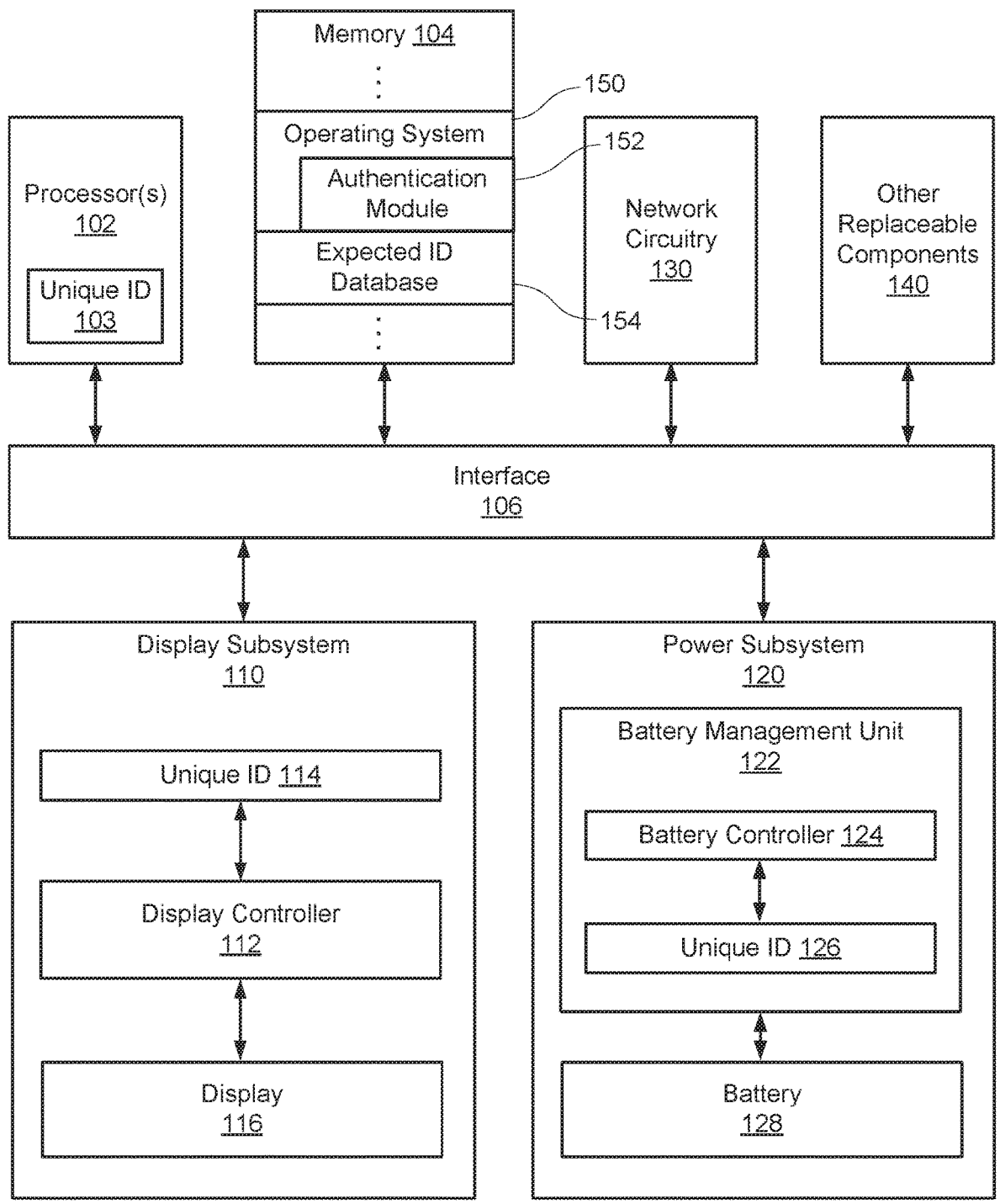
FIG. 1 illustrates a block diagram of an example multifunction device with replaceable components according to some examples of the disclosure.

FIG. 1 illustrates a block diagram of an example multifunction device 100 with replaceable components according to some examples of the disclosure. In some examples, device 100 includes one or more processors 102 and memory 104, a display subsystem 110 and power subsystem 120, and network circuitry 130. Device 100 can also include other replaceable components 140 not otherwise illustrated in FIG. 1. In some examples, these components communicate over one or more communication buses or signal lines (e.g., interface 106). It should be appreciated that device 100 is only one example of a multifunction device, and that device 100 optionally has more or fewer components than shown, optionally combines two or more components, or optionally has a different configuration or arrangement of the components. The various components shown in FIG. 1 are implemented in hardware, software, or a combination of both hardware and software, including one or more signal processing and/or application-specific integrated circuits (ASICs).

In some examples, the one or more processors 102 includes a unique identifier 103 that uniquely identifies the processor (e.g., such as a processor serial number). In some examples, unique identifier 103 of the processor can serve as a proxy for the unique identifier of device 100. In some examples, device 100 maintains its own unique identifier (not shown). As discussed below, the unique identifiers can be a separate hardware circuitry associated with the component that the unique identifier identifies that provides the unique identifier in response to a query, or can be hard-coded into software and/or firmware (or hardware of the component to which the unique identifier belongs). In some examples, each component with a unique identifier has its own unique identifier hardware circuitry. In some examples, the respective unique hardware circuitry is physically packaged with the component. In some examples, the unique hardware circuitry is physically packaged with a controller for the respective component (e.g., battery management unit, battery controller, display controller, etc.).

Memory 104 (e.g., a non-transitory computer readable storage medium) optionally includes high-speed random access memory and optionally also includes non-volatile memory, such as one or more magnetic disk storage devices, flash memory devices, or other non-volatile solid-state memory devices. The one or more processors 102 can run or execute various software programs and/or sets of instructions stored in memory 104 to perform various functions for device 100 and to process data. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, memory 104 stores instructions for executing the operating system of device 100≈. In some examples, memory 104 includes a single memory component or a combination of multiple memory components. Operating system 150 can include various procedures, sets of instructions, software components and/or drivers for controlling and managing general system tasks (e.g., memory management, storage device control, power management, etc.) and facilitates communication between various hardware and software components. In some examples, the operating system module 150 includes an authentication module 152. Authentication module 152 can be a software method or process that authenticates the components of device 100 as will be described in further detail below with respect to FIGS. 3 and 4, and can be executed by processor(s) 102. It is understood that authentication module 152 can be a combination of multiple methods, processes, functions, subfunctions, etc.

In some examples, memory 104 stores an expected ID database 154. In some examples, the expected ID database 154 is stored in its own memory component that is separate from the memory component(s) that stores instructions for the operating system and/or other applications. In some examples, expected ID database 154 includes a listing of the unique identifiers for a plurality of components that have been registered as being installed on device 100 or otherwise associated with device 100 (e.g., such as unique ID 103, 114, and 126). Expected ID database 154 can be stored in any format. In some examples, the expected ID database can only be modified or updated in response to receiving a write or update command from an authorized authority (e.g., such as an approved server or approved user). In some examples, the expected ID database is associated with a unique ID associated with the device (e.g., the unique ID of the device itself or the unique ID of a processor of the device). In some examples, some or all of the expected ID database is encrypted. For example, the expected ID database's association with the device can be cryptographically protected. In some examples, the expected ID database signed by a trusted or otherwise certified authority (e.g., cryptographically signed using a key associated with the certified authority). In some examples, the trusted authority is a server that maintains a global database of device-component associations (as will be described in more detail below).

Each of these modules can correspond to a set of instructions for performing one or more functions described above and the methods described in this application (e.g., the computer-implemented methods and other information processing methods described herein). In some embodiments, the memory, when executed one or more processors, can cause the processors (e.g., and/or the device) to perform the methods described below. These modules (i.e., sets of instructions) need not be implemented as separate software programs, procedures or modules, and thus various subsets of these modules may be combined or otherwise rearranged in various examples. In some examples, memory 104 may store a subset of the modules and data structures identified above. Furthermore, memory 104 may store additional modules and data structures not described above.

Network circuitry 130 sends and receives communication signals, such as wired or wireless signals. Network circuitry 130 optionally includes well-known circuitry for performing these functions, including but not limited to an antenna system, a transceiver, one or more amplifiers, a tuner, one or more oscillators, a digital signal processor, a CODEC chipset, a subscriber identity module (SIM) card, memory, and so forth. Network circuitry 130 optionally communicates with networks, such as the Internet, also referred to as the World Wide Web (WWW), an intranet and/or a wireless network, such as a cellular telephone network, a wired local area network (LAN), a wireless local area network (WLAN) and/or a metropolitan area network (MAN), and other devices by wired or wireless communication. Network circuitry 130 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Device 100 can include one or more input controllers (not shown) for receiving/sending electrical signals from/to input control devices. The input control devices optionally include physical buttons (e.g., push buttons, rocker buttons, etc.), dials, slider switches, joysticks, click wheels, and so forth. In some alternate examples, input controller(s) are, optionally, coupled to any (or none) of the following: a keyboard, an infrared port, a USB port, and a pointer device such as a mouse. The one or more buttons optionally include an up/down button for volume control. The one or more buttons optionally include a push button.

Display subsystem 110 manages and/or controls the interaction of device 100 with display 116. In some examples, display subsystem 110 includes a display controller 112 (e.g., displayer controller circuitry) and display 116. In some examples, display 116 is a touch-sensitive display. Display 116 provides an output interface and optionally an input interface between the device and a user. Display controller 112 receives and/or sends electrical signals from/to display 116. Display 116 displays visual output to the user. The visual output optionally includes graphics, text, icons, video, and any combination thereof (collectively termed "graphics"). In some examples, some or all of the visual output optionally corresponds to user-interface objects. In some examples, display subsystem 110 includes a unique identifier (ID) 114. In some examples, unique identifier 114 uniquely identifies display 116, such as a display serial number (e.g., an EDID). In some examples, unique identifier 114 is a hardware component that stores the unique identifier 114 and provides the display's unique identifier 114 in response to a query by display controller 112 or the one or more processors 102. In some examples, unique identifier 114 is encrypted or otherwise cryptographically stored and/or transmitted. In some examples, unique identifier 114 is implemented in software and/or firmware (e.g., a hard-coded register).

In some examples, display 116 is a replaceable component. In some examples, display 116 can be replaced individually or display 116 can be attached to display controller 112 and unique ID 114 such that the set must be replaced together (e.g., packaged together).

In some examples, in addition to the display, device 100 optionally includes a touchpad (not shown) for activating or deactivating particular functions. In some examples, the touchpad is a touch-sensitive area of the device that, unlike the touch screen, does not display visual output. The touchpad is, optionally, a touch-sensitive surface that is separate from display 112 or an extension of the touch-sensitive surface formed by the display.

Device 100 also includes power system 120 for powering the various components of device 100. Power subsystem 120 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and/or distribution of power in devices. In the example illustrated in FIG. 1, device power subsystem 120 includes a battery management system 122 for controlling and/or managing interactions with battery 128. In some examples, battery management system 122 is a discrete hardware component (e.g., circuitry) and includes a battery controller 124 that receives and/or sends electrical signals from/to battery 128. Battery 128 stores and provides power to the various components of device 100. Battery 128 can also be recharged from an external power source. In some examples, battery 128 can be composed of one or more battery cells (e.g., lithium ion or other chemical components) that store electrical charge.

In some examples, battery 128 is a replaceable component. In some examples, battery 128 can be replaced individually or battery 128 can be attached to battery management unit 122 such that the pair must be replaced together (e.g., packaged together). In some examples, battery management unit 122 includes a unique identifier (ID) 126. In some examples, unique identifier 126 uniquely identifies battery 128 (e.g., uniquely identifies the battery management unit 122, battery cells in battery 128, and/or the combination of the battery management unit and the battery cells in the battery), such as a battery serial number. In some examples, unique identifier 126 is a hardware component that stores the unique identifier 126 and provides the battery's unique identifier 126 in response to a query by battery controller 124 or the one or more processors 102. In some examples, unique identifier 126 is encrypted or otherwise cryptographically stored and/or transmitted. In some examples, unique identifier 126 is implemented in software (e.g., a hard-coded register). In some examples, as shown in FIG. 1, unique identifier 126 is integrated into battery management unit 122 (e.g., on the same chip, ASIC, or other discrete component). In some examples, unique identifier 126 can be a separate component from battery management unit 122 that is queried by the battery management unit 122 to retrieve the unique ID.

In some examples, device 100 includes one or more other replaceable components 140 that are not otherwise described above. A replaceable component is a component that can be removed from the device and replaced with another component. It is understood that a replaceable component need not be a component that was designed to be replaced and can encompass any component that can potentially be removed from the device and replaced without causing irreparable harm to the device (e.g., by a device repair vendor, an at-home replacement kit, etc.). Examples of such components include displays, batteries, buttons, memory, antennas, sensors, keyboards, dials, touchpads, speakers, etc. Any of these replaceable components can include a unique identifier similar to the unique identifiers described above, can be included in the expected ID database 154, and/or can be monitored according to the authentication processes described below with respect to FIGS. 3-5. In some examples, not all of the replaceable components in an electronic device are monitored according to the authentication processes described herein (e.g., because there is no risk of damage due to installation of the respective component).

Figure 2A:
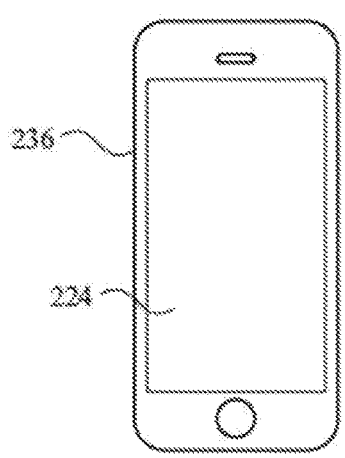
FIGS. 2A-2E illustrate example electronic devices whose installed components can be authenticated according to examples of the disclosure.
Figure 2B:
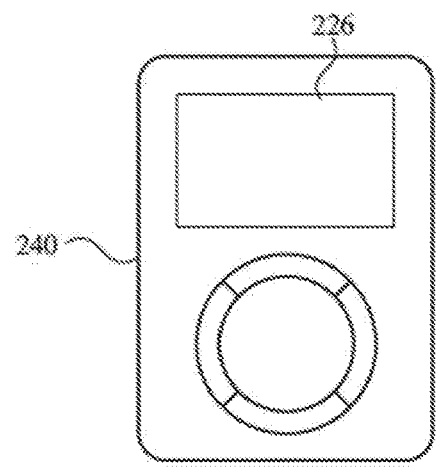
Figure 2C:
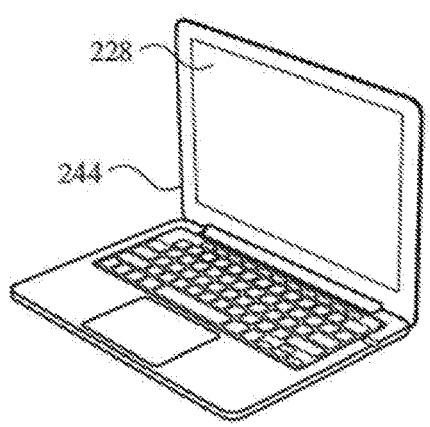
Figure 2D:
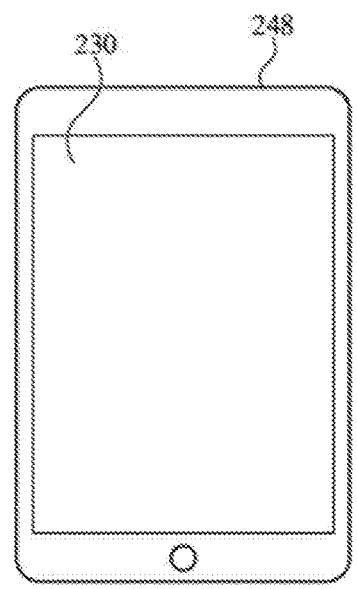
Figure 2E:
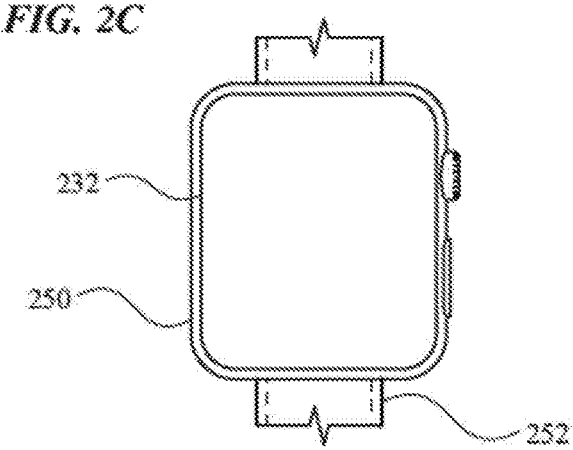

FIGS. 2A-2E illustrate example electronic devices whose installed components can be authenticated according to examples of the disclosure. The devices illustrated in FIG. 2A-2E can share features of device 100 described above with respect to FIG. 1 and can include, inter alia, any or all of the components described with respect to device 100. FIG. 2A illustrates an example mobile telephone 236 that includes a touch screen 224 (e.g., the iPhone® from Apple Inc. of Cupertino, Calif.), battery, and/or other replaceable components that can be authenticated according to examples of the disclosure. FIG. 1B illustrates an example digital media player 240 (e.g., iPod Touch® from Apple Inc.) that includes a touch screen 226, battery, and/or other replaceable components that can be authenticated according to examples of the disclosure. FIG. 2C illustrates an example personal computer 244 (e.g., iMac®, MacBook® from Apple Inc.) that includes a touch screen 228, battery, and/or other replaceable components that can be authenticated according to examples of the disclosure. FIG. 2D illustrates an example tablet computing device 248 (e.g., iPad® from Apple Inc.) that includes a touch screen 230, battery, and/or other replaceable components that can be authenticated according to examples of the disclosure. FIG. 2E illustrates an example wearable device 250 (e.g., Apple Watch® from Apple Inc.) that includes a touch screen 232, battery, and/or other replaceable components and can be attached to a user using a strap 252 and whose components can be authenticated according to examples of the disclosure. Additionally, it should be understood that although the electronic devices of FIGS. 2A-2E include touch screens, component authentication can be implemented on electronic devices without a touch screen or a display. Additionally, the electronic devices may include one or more other physical user-interface devices, such as a physical keyboard, a mouse, and/or a joystick.

Figure 3:
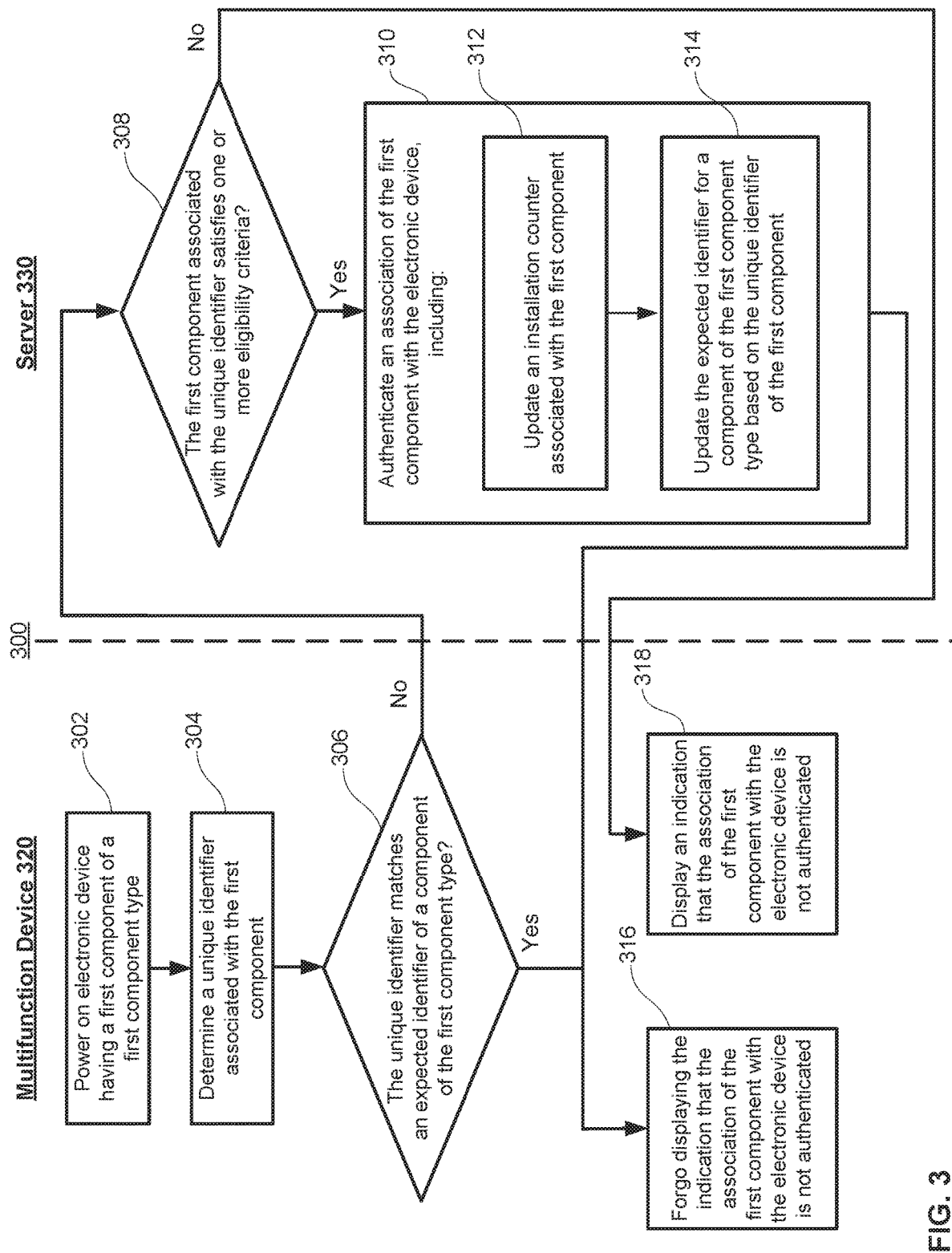
FIG. 3 illustrates a method of authenticating an association of an installed component with an electronic device according to examples of the disclosure.
Figure 4:
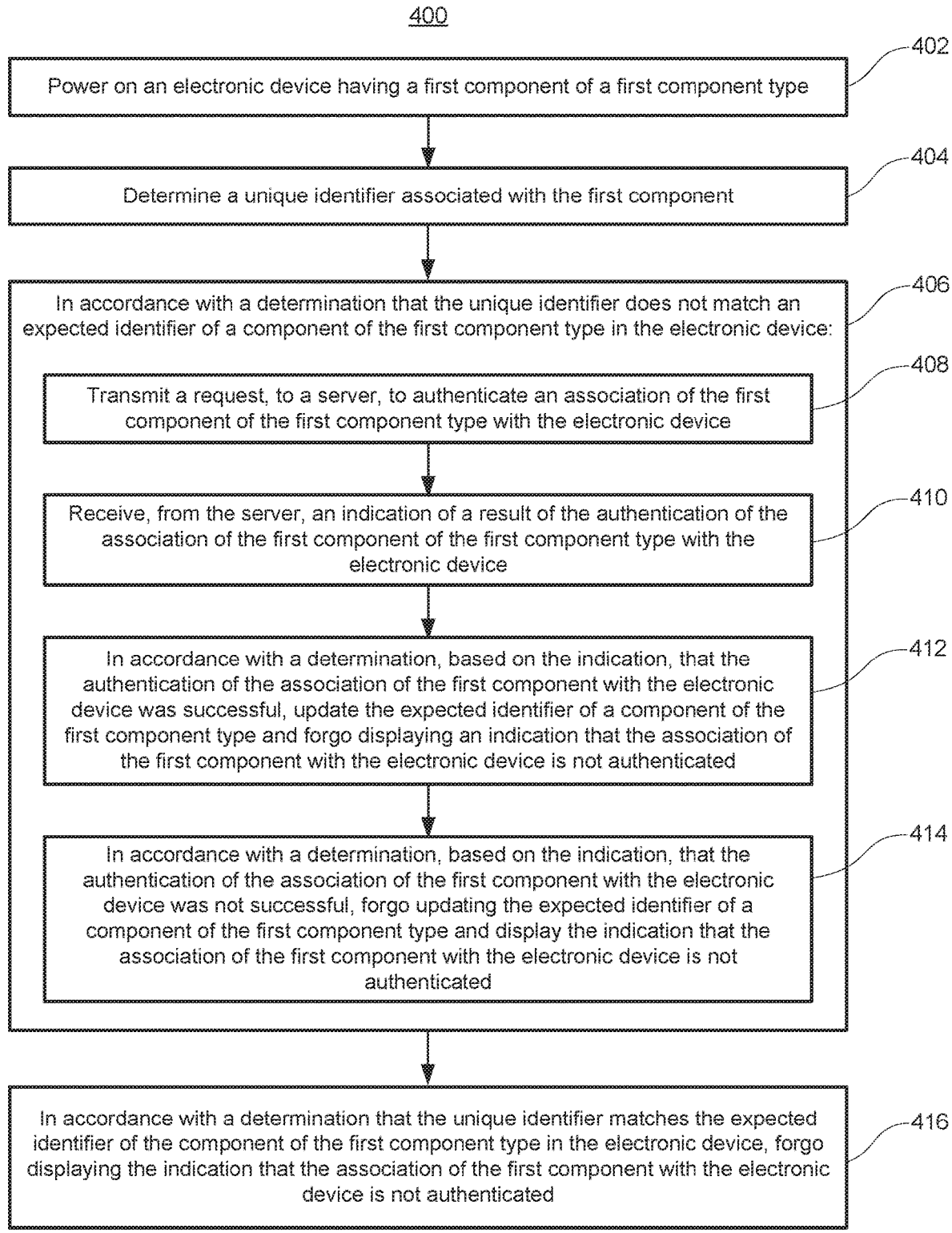
FIG. 4 illustrates a method of authenticating an association of an installed component with an electronic device performed by a device according to examples of the disclosure.
Figure 5:
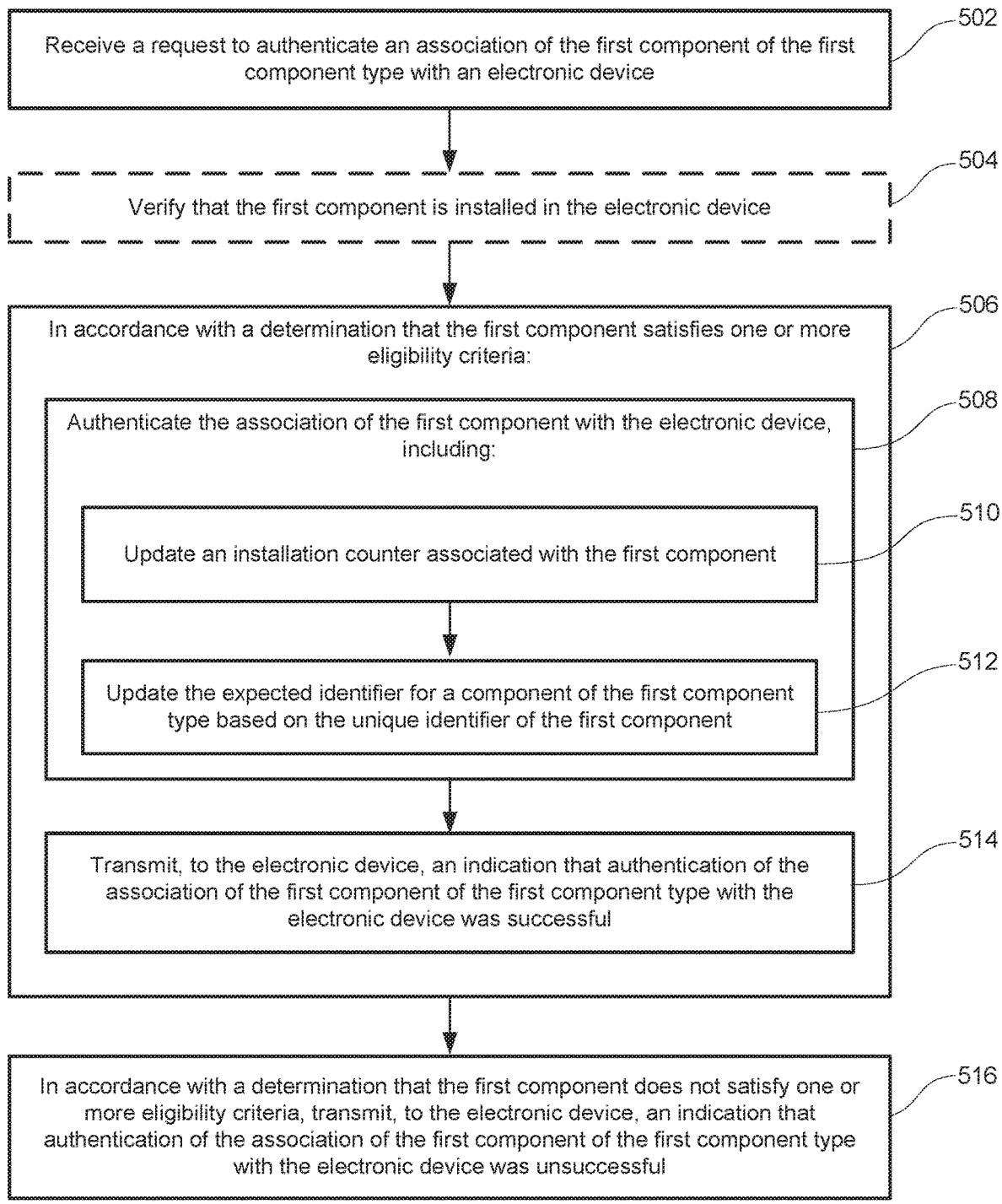
FIG. 5 illustrates a method of authenticating an association of an installed component with an electronic device performed by a server according to examples of the disclosure.

Attention is now directed to FIGS. 3-5, which illustrate example methods of authenticating an association between a component of a device and the device. In some examples, one or more components of a device (e.g., such as device 100) may naturally deteriorate during ordinary usage. Thus, a user may desire to replace certain components of the device in exchange for newer components. In some examples, replacement of components introduces risk of damage to the newly installed component or other components of the device. For example, battery 128 can be packaged in a soft packaging and be susceptible to physical punctures or other trauma during handling and/or installation. In other examples, battery 128 can change dimensions as the battery ages (e.g., during normal device 100 operation). If not properly installed, battery 128 can press against other components of device 100 as the battery changes dimensions during the natural aging of the battery, potentially causing physical puncture or other physical trauma. In some examples, damage to battery 128 can cause the development of flaws in the chemical composition of battery 128. In some examples, the flaws can develop over time and affect the performance of battery 128 or cause failure of battery 128. In some examples, different types of components can tolerate different amounts of handling and/or installations before the risk of potential damage is above an acceptable level. Thus, to mitigate the risk of damage or failure of installed components, there is a need to monitor the number of installations that a particular component has undergone.

FIG. 3 illustrates a method 300 of authenticating an association of an installed component with an electronic device 320 according to examples of the disclosure. As shown in FIG. 3, some steps of method 300 can be performed at a multifunctional device 320 and some steps can be performed at a server 330 that is in communication (e.g., network communication, whether wired or wireless) with the multifunctional device 320. It is understood that although FIG. 3 illustrates certain steps as being performed by the device 320 or by the server 330, any of the illustrated and described steps can be performed at either the device 320 or the server 330 and are not limited to the delineation illustrated in FIG. 3. In some examples, device 320 illustrated in FIG. 3 can share similar features as device 100 described above with respect to FIG. 1 and/or any of the devices described in FIG. 2. In some examples, server 330 illustrated in FIG. 3 can be any server that is accessible via a network connection (e.g., over the internet, intranet, etc.). In some examples, server 300 shares similar features as device 100, such as having a processor, memory, network circuitry, etc.

At 302, device 320 having a first component of a first component type is powered on. In some examples, the first component is a replaceable hardware component similar to those described above with respect to FIG. 1, such as a battery or display. In some examples, upon powering on the device, the device performs an initialization or boot-up sequence. In some examples, the initialization or boot-up sequence includes querying a plurality of components that are installed on the device. In some examples, at 304, the device determines a unique identifier associated with the first component of the first component type. For example, during the initialization sequence, the processor(s) of device 320 queries the component to provide its unique identifier and in response to the query, the component provides the processor with the component's unique identifier. In some examples, the processor queries a controller that communicates with the respective component for the respective component's unique ID, such as a display controller or a battery management unit.

At 306, device 320 compares the component's unique identifier against an expected identifier for the respective component's component type. In some examples, device 320 (e.g., the processor(s) of device 320) queries an expected ID database to determine the expected identifier for the respective component type. For example, the expected ID database can include an entry for each component type. In some examples, the expected ID entry can be a key-value pair (e.g., or a hash table) that associates the component type with the expected ID. The expected ID can be initially populated during manufacture time or can be updated during a previous repair session. In some examples, the expected ID database is stored in the memory of device 320. In some examples, the expected ID database is stored on server 330 and device 320 queries server 330 to provide the expected ID for the first component type.

At 306, device 320 (e.g., the processor(s) of device 320) determines whether the unique identifier for the first component matches the expected identifier retrieved from the expected ID database. If the unique identifier matches the expected identifier, then device 320 determines that the first component has not been replaced with another component. In some examples, device 320 may have been subjected to a repair in which the component has been removed and re-installed, in which case the unique identifier will continue to match the expected identifier. If the unique identifier matches the expected identifier, then method 300 moves to step 316. At 316, in accordance with a determination that the unique identifier matches the expected identifier, device 320 forgoes displaying an indication that the association of the first component with the electronic device is not authenticated (e.g., and device 320 continues to operate normally).

At 306, if the unique identifier does not match the expected identifier, then device 320 determines that the first component has been replaced with another component. In some examples, device 320 will then initiate a process for authenticating the newly installed component, associating the newly installed component with device 320, and updating the expected ID database with newly installed component's unique ID. In some examples, the process for authenticating the newly installed component and updating the expected ID comprises transmitting a request to server 330 to authenticate the newly installed component. In some examples, the transmitted request includes the unique identifier of the first component. In some examples, the transmitted request includes the unique identifier of device 320. In some examples, the unique identifier of the processor (e.g., such as unique ID 103) of device 320 serves as a proxy for the unique identifier of device 320. In other words, in some examples, the transmitted request includes the unique identifier of the processor, instead of the unique identifier of device 320. In some examples, device 320 has its own unique identifier, different from the unique identifier of the processor, and the transmitted request includes device 320's own unique identifier instead of the unique identifier of the processor.

In some examples, such as when device 320 is powered on for the first time, the device does not contain a local copy of the expected ID database. Thus, in such examples, the device is unable to perform steps 304 and 306 locally. In some examples, if the device determines that it is unable to perform steps 304 and 306 locally, the device transmits a request to server 330 to perform steps 304 and 306 (e.g., in conjunction with server 330). For example, server 330 can transmit the expected ID of the first component to device 320 in response to a request for the expected ID of the first component and device 320 can perform the determination. In some examples, device 320 can transmit the unique identifier of the first component to server 330 and server 330 can perform the determination. In some examples, if method 330 is successfully completed (e.g., is not prematurely terminated), device 320 can obtain a local copy of the expected ID database (e.g., from server 330), and will be able to perform steps 304 and 306 locally (e.g., without needing to query server 330).

In some examples, at 308, in response to the request, server 330 determines whether the first component satisfies one or more eligibility criteria. In some examples, the determination is performed using the unique ID of the first component included in the request. In some examples, the one or more eligibility criteria are satisfied if any, all, or any combination of the below-described requirements are satisfied.

In some examples, at 308, device 320 opens a communication session with server 330. In some examples, opening a communication session includes contacting server 330 and identifying, to server 330, that device 320 is under repair. In some examples, identifying that device 320 is under repair enables certain functionalities and/or features to be performed at server 330 and/or device 320 (e.g., such as those described herein). In some examples, opening a communication session includes logging into server 330 using an account of the entity performing the installation (e.g., a repair entity, a contract manufacturer, a customer, an end-user, device owner, etc.). In some examples, logging into server 330 using the account of the entity performing the installation allows server 330 to verify that the installation entity is approved to access one or more of the functions described herein (e.g., such as transmitting a valid request to authenticate the newly installed component and/or transmitting a valid claim command to the server). In some examples, the communication session allows data and/or information to be transmitted between server 330 and device 320 to perform the necessary initialization and/or authentication steps. In some examples, the communication session is a direct communication session between device 320 and server 330. In some examples, the communication session is between server 330 and a host device which is in communication with device 320 (e.g., such as a repair station, a computer, etc. that is connected to device 320 for the purposes of initializing device 320 and/or completing the installation of the newly installed component). In some examples, the communication session is open throughout the authentication process and is closed when authentication has either completed successfully or fails. In some examples, the eligibility criteria is not satisfied if device 320 has not been identified as being under repair (e.g., the authentication process cannot proceed unless device 320 is marked as being under repair).

In some examples, the server transmits an authentication challenge to the device to verify that the first component is installed onto the device. Details of this verification process will be described in more detail below with respect to FIG. 5. In some examples, if verification is unsuccessful, the eligibility criteria is not satisfied. In some examples, if verification is successful, then the installation verification requirement is satisfied. In some examples, server 330 (e.g., the processor(s) of server 330) determines whether the first component is an authentic component. In some examples, this is performed by comparing the unique identifier of the first component against a database of all known authentic components. In some examples, if the unique identifier matches an entry in the database of all known authentic components (or a database of known authentic components of the respective component type), then the first component is determined to be an authentic component. If the unique identifier does not match any entry in the database of all known authentic components, then the first component is determined to not be an authentic component. Thus, in some examples, server 330 is able to verify whether the component is an authentic component. In some examples, if the component is not an authentic component, then the eligibility criteria is not satisfied. In some examples, as described in further detail below, if the component is on a watchlist, then the eligibility criteria is not satisfied. In some examples, if the component is verified as an authentic component (and optionally if the component is verified as not a component on the watchlist), then the component authenticity requirement is satisfied.

In some examples, verifying the authenticity of the component can be performed by determining whether a certificate of the device is authentic. In some examples, the certificate of the component contains the component's unique ID (e.g., an object identifier, OID, etc.). In some examples, server 330 receives a certificate of the component (e.g., server 330 can request the certificate from the component and/or the device). In some examples, the certificate is signed by the entity that issued the certificate. In some examples, server 330 can determine that the certificate is signed by a trusted authority (e.g., the entity that issued and signed the certificate is known and approved) and can determine that the component is an authentic component. In some examples, the certificate is issued by the manufacturer of the device and server 330 can determine that the component is an authentic component based on the certificate being signed by the manufacturer of the device. Thus, in some examples, authenticity verification can be performed without the use of a database of known authentic components.

In some examples, server 330 determines the number of times the first component has been installed into a device (e.g., installed into any device and not just the device into which the first component is currently installed). In some examples, this determination is performed by querying a global installation counter using the unique identifier for the first component. In some examples, a global database maintains an installation count of the number of times a particular component has been installed into any device (e.g., a list of component unique identifiers associated with corresponding installation counts). In some examples, the global database includes a plurality of key-value pairs (e.g., or a hash table) that associates a plurality of unique identifiers (e.g., the keys) with the respective installation counts of the respective hardware component (e.g., the values). Thus, using this global database, the server is able to determine whether a particular component has been installed more than the maximum number of times deemed as safe for the particular component. In some examples, server 330 (or equivalent server) is notified any time a device determines that a new component has been installed in a device such that the global database is able to maintain an accurate global installation count (e.g., via method 300 or any other suitable method).

In some examples, the certificate of the component can include an entry indicating the number of times the component has been installed into any device. For example, when the component is installed into a device (e.g., after the component has been associated with the device), the certificate can be updated to increment the installation counter. In some examples, when the component is installed into a device (e.g., after the component has been associated with the device), a new certificate can be issued (e.g., by server 330, a trusted authority, or other entity authorized to issue component certificates) with an updated installation counter.

In some examples, if the number of times that the first component has been installed into a device (not including the current installation or including the current installation) is at or above a maximum amount (e.g., 1 time, 3 times, 5 times), then the eligibility criteria is not satisfied. In some examples, if the number of times that the first component has been installed into a device is below a maximum amount, then the installation count requirement is satisfied. In some examples, the maximum amount varies by component type. For example, the maximum installation count for a battery can be one and the maximum installation count for a display can be five. In some examples, the maximum amount can vary based on the entity that is performing the installation. For example, if a repair vendor that has login access to the authentication server (e.g., server 330) is performing the installation (and thus the querying of server is by the electronic device while at the location of the repair vendor), then the maximum installation count can be more than if a repair vendor that does not have login access to the authentication server is performing the installation (e.g., one more, two more, three more installations). In some examples, whether the repair entity has access to the authentication server or not can be determined based on the location of the device (e.g., using the device's GPS coordinates, the location associated with the IP address of the device, the location associated with repair entity, etc.). For example, if the location of device 320 matches the known address of a known repair entity, then server 330 can adjust the maximum installation count for the respective component. In some examples, the determination can be made based on the user account that is logged into the device and/or server 330. For example, if the repair entity has logged into device 320 using the repair entity's account, then server 330 can determine that the current location of the device is the location of the repair entity. In some examples, the request transmitted from the device to the server includes the location information of device 320. In some examples, the repair entity can log into the server (e.g., server 330) using the repair entity's account. For example, server 320 can transmit a request to the device to log into server 320 using an repair entity's account. In some examples, the repair entity can identify, to server 320, the device as being under repair. Thus, in some embodiments, the request to authenticate the newly installed component transmitted from the device to the server can be performed during a communication session in which the repair entity is logged into server 320 (e.g., such as the communication session described above with respect to step 308). In some examples, the transmitted request includes one or more other information used by the server during the process to authenticate the association of the first component with device 320. In some examples, the server receives this information in response to a query (a single query, separate queries, etc.) to the electronic device for the information. For example, during the communication session between the server and the device, the server can request information from the repair entity. In some examples, the request is displayed on the device and the repair entity can provide the information through the input devices of the device. In some examples, the request is displayed on the host machine to which the device is connected (e.g., a laptop, a computer, a repair station, etc.) and the repair entity can provide the information through the input devices of the host machine.

In some examples, if the installation is performed at the factory or at an authorized installation contractor for initial assembly of the device, then the eligibility criteria is always satisfied. For example, in some examples, one or more of the requirements described above are waived. In some examples, if the installation is performed within a certain time frame after a previous installation (e.g., within 1 hour, 2 hours, 3 hours), then eligibility will not be unsuccessful for the current request if the previous request caused the installation counter to reach or exceed the maximum installation count. For example, in some examples, if an installation is performed within a certain time period after a previous installation, then the installation count requirement is waived for the current installation (if the previous installation's association was successfully authenticated). In some examples, the installation count requirement is only waived for installations within a certain time period after a previous installation if the repair entity is a repair entity with login access to the authentication server. In some examples, other specific situations can cause some or all of the requirements to be waived or for the eligibility criteria to always be satisfied.

In some examples, if the eligibility criteria are satisfied, then server 330 determines that the first component is eligible to be installed in device 320 and the association of the first component with the electronic device is permitted (e.g., the installation of the first component in the electronic device is permitted).

In some examples, after server 330 determines whether the one or more eligibility criteria are satisfied for the first component (e.g., as in step 308), server 330 transmits an indication of the results of the one or more eligibility criteria to the device. In some embodiments, the indication is a certificate, similar to the certificate described below with respect to step 410 of FIG. 4. In some examples, the device determines, from the indication, whether the eligibility criteria are satisfied (e.g., whether the first component is eligible to be associated with the electronic device or whether association is not required). In some examples, the received indication (from the server) indicates that the unique ID of the first component matches the expected unique ID at the server (e.g., even though the unique ID of the first component does not match the expected unique ID on the device). Thus, in some examples, it is determined that the expected unique ID database stored on the device is in error and does not match the expected unique ID stored at the server (e.g., as opposed to the first component being a newly installed component). In some examples, in response to determining that the device's expected unique ID database is in error, the device initiates a process to recover or restore its unique ID database (e.g., correct the error in the unique ID database). In some examples, the device transmits a request to the server, receives the proper entries for the expected ID database, and updates its expected ID database with the corrected entries (e.g., using a process similar to the process for updating the expected ID database stored at the device to reflect a successful association, as described below).

In some examples, if the received indication indicates that the unique ID does not match the expected unique ID (e.g., that the first component is a newly installed component) and that the first component is eligible to be installed in the device, the device transmits a claim command to the server. In some examples, the claim command is a formal request to initiate the process to associate the first component with the electronic device. In some examples, in response to the claim command, method 300 proceeds to step 310. In some examples, method 300 proceeds to step 310 without transmitting an indication of the result of the one or more eligibility criteria to the device (e.g., and without requiring reception of a claim command from the device). In some embodiments, if device 320 does not issue a claim command to the server, then method 300 does not proceed to continue the process of associating the first component with the electronic device.

In some examples, method 300 proceeds to step 310 to authenticate the association of the first component with the electronic device. In some examples, authenticating the association of the first component with the electronic device includes updating the installation count associated with the first component (312). In some examples, the installation count that is updated is the same installation count in the global database that server 330 queried at step 308 to determine the number of installations that the first component has experienced. In some examples, updating the installation counter comprises incrementing the installation count by one. In some examples, if the installation count criteria is waived (e.g., for initial assembly or if the installation is performed within a certain time period after a previous installation attempt), then the installation count is not updated (e.g., the current installation does not count against the installation count of the first component). In some examples, other specific situations can cause the installation count to not be updated.

In some examples, authenticating the association of the first component with the electronic device includes updating the expected identifier for a component of the first component type based on the unique identifier of the first component (314). In some examples, updating the expected identifier includes updating the respective entry in the expected identifier database that is stored at server 330 to be the unique identifier of the first component (e.g., replacing the unique identifier associated with a previously installed component that was stored in the respective entry with the unique identifier of the first component). In some examples, the expected identifier database stored at server 330 is similar to the expected identifier database that is stored at device 320. In some examples, the expected identifier database stored at server 330 is a superset of the expected identifier database stored at device 320 (e.g., the expected identifier database stored at device 320 is the expected identifier database stored at server 330 filtered for only the entries that are relevant to device 320 and not including any entries associated with other devices). In some examples, the expected identifier database stored at server 330 is a global expected identifier database and includes entries for the associations of every known installed component with their respective devices. Thus, updating the respective entry in the expected identifier database with the unique identifier of the first component associates the first component with device 320 (e.g., the association is successfully authenticated and registered). In some examples, although the expected identifier database stored at server 330 includes associations of every known installed component, device 320 is only able to access the entries that are relevant to device 320 (e.g., the entries of components associated with device 320).

In some examples, after server 330 updates the installation counter associated with the first component and updates the expected identifier for the component with the unique identifier of the first component, the association of the first component with the electronic device is successfully authenticated. In some examples, updating the installation counter includes incrementing the installation counter by one to reflect the current installation. It is understood that the installation counter can only be incremented upwards in response to installations or uninstallations on device 320. For example, de-association of the first component from device 320 (e.g., removing the first component from device 320 or replacing the expected identifier database with a new component when a new component is installed) does not cause the installation counter for the first component to be reduced. In some examples, in accordance with or in response to the successful authentication, server 330 optionally transmits an indicator (e.g., notification, command, message, etc.) to device 320 indicating that the association has been successfully authenticated. In some examples, if the first component does not satisfy the one or more eligibility criteria such that the association was not successfully authenticated, server 330 optionally transmits an indicator (e.g., notification, command, message, etc.) to device 320 indicating that the authentication was not successful.

In some examples, server 330 can authorize device 320 to update the expected identifier database that is stored at device 320. For example, after device 320 receives the indication that the association was successfully authenticated, device 320 can transmit a request to server 330 to approve device 320 to update its expected identifier database that is stored at device 320. In some examples, server 330 can transmit an approval to device 320 for updating its expected identifier database that is stored at device 320 (e.g., in response to device 320 transmitting a request to server 330 to approve updating its expected identifier database).

In some examples, in response to receiving the indication from the server, device 320 continues and/or completes the initialization or boot-up sequence. In some examples, in response to receiving the indication that the authentication was successful or in accordance with a determination that the indication indicates that the authentication was successful, the device forgoes displaying an indication that the association of the first component with the electronic device is not authenticated (316). In some examples, in response to receiving an indication that the authenticated was not successful or in accordance with an indication that the indication indicates that the authentication was not successful, the device displays (318) an indication that the association was not authenticated. In some examples, the indication that the association was not authenticated is displayed on a status user interface for the respective component. In some examples, the indication is displayed as a persistent or dismissible notification (e.g., on a wake/lock screen user interface, on a notification user interface, as a pop-up notification, etc.). In some examples, the displayed indication indicates that the installed component could not be authenticated, could not be successfully associated with the device, may not be an authentic component and/or may not function properly. In some examples, the indication is displayed for a threshold amount of time (e.g., 3 days, 5 days, 7 days) or for a threshold number of device reboots (e.g., 2, 3, 5 reboots), after which the indication is not displayed.

In some examples, in accordance with a determination that the association was not successfully authenticated, the device can perform any number of a variety of actions, including modifying the functionality of aspects of the device, providing notifications to the user, modifying the behavior of aspects of the device, or in some cases disabling certain functionality that optionally can be subsequently re-enabled by the user (e.g., via a settings user interface). In some examples, the device is still functional despite the authentication being unsuccessful. In some examples, the device remains functional except where continued full operation of the device poses a safety, security, and/or privacy risk to the device and/or the user (e.g., if the installed component is potentially malicious). In some examples, any or all disabled functions can be re-enabled by the user via options on a settings user interface.

In some embodiments, as described above, when the device is powered on for the first time, the device may not contain a local copy of the expected ID database. Thus, in such embodiments, the device can contact the server to authenticate the components that are installed in the device and/or to obtain a local copy of the expected ID database. In some embodiments, the server is able to determine that a unique ID of a component of the device is marked as stolen or is otherwise on a watchlist (e.g., at step 308). For example, a device that has been stolen can be marked as stolen and the stolen device and/or any or all of the components of the stolen device can be marked as stolen and/or added to a watchlist. In some embodiments, the expected identifier database stored at the server can include data of whether a respective component is on a watchlist or stolen (e.g., the entry associated with the respective component can have a watchlist or stolen flag). In some embodiments, the database of all known authentic components stored at the server can include data of whether a respective component is on a watchlist or stolen (e.g., the entry associated with the respective component can have a watchlist or stolen flag). In some embodiments, a separate database stored at the server can store the unique ID of components or devices that are known to be stolen. In some embodiments, in response to the server determining that a respective device has a respective component that is on a watchlist or is marked as stolen and/or that the respective device itself is on the watchlist (e.g., the unique ID associated with the respective component or respective device is on the watchlist), the server can transmit a command (e.g., signal, command, request, or other message) to the device to respond accordingly, such as by performing any number of a variety of actions, similar to those described above (e.g., modifying functionality of aspects of the device, providing notifications to the user, modifying the behavior of aspects of the device, or in some cases disabling certain functionality that optionally can be subsequently re-enabled by the user). In some embodiments, the server can transmit a command (e.g., signal, command, request, or other message) to the device to prevent the device from fully initializing (e.g., from completing the initialization process). In some embodiments, the device can operate in a safe-mode or a modified mode until repaired or restored by a repair authority (e.g., a repair entity with login access to the authentication server, manufacturer, customer, end-user, owner of the device, etc.).

FIG. 4 illustrates a method 400 of authenticating an association of an installed component with an electronic device performed by a device according to examples of the disclosure. In some examples, method 400 is performed by an electronic device, such as device 100 described above with respect to FIG. 1 and/or device 320 described above with respect to FIG. 3. At 402, a device having a first component of a first component type is powered on. In some examples, as described above, the device performs an initialization or boot-up sequence, including determining a unique identifier associated with the first component (404). In some examples, the device can determine the unique identifier separate from an initialization or boot-up sequence (e.g., in response to a user request to associate installed components with the device). In some examples, the device queries an expected ID database and determines an expected ID for a component of the first component type. In some examples, the device compares the unique identifier of the first component against the expected identifier from the expected ID database. In some examples, if the unique identifier does not match the expected identifier, the device determines that the first component is a newly installed component and is not currently associated with the device. In some examples, in accordance with a determination that the unique identifier does not match the expected identifier (406), the device transmits (408) a request to a server (e.g., such as server 330 described above with respect to FIG. 3) to authenticate an association of the first component with the electronic device. In some examples, while the process for authenticating an association of the first component with the electronic device is in progress, device 320 displays, on the display, an indicator or notification that the device is in the process of authenticating the first component.

In some examples, in response to the request, the server initiates a process to authenticate the association, similar to methods 300 and 500 described with respect to FIG. 3 and FIG. 5. In some examples, the server issues a verification request to the electronic device to verify the identity of the first component and/or to verify that the first component is installed in the first electronic device. In some embodiments, the verification includes a challenge. In some embodiments, the challenge is a randomly generated number. In some embodiments, the challenge is any placeholder or data packet. In some examples, the device verifies the identity of the first component and/or that the first component is installed in the first electronic device by digitally signing the challenge using a key that is unique to the component of the device (e.g., the private key of the component) and transmitting the signed challenge back to the server. For example, a battery management unit in the device can digitally sign a challenge using the key of the battery management unit or the key of the battery, thus verifying that the battery is installed in the electronic device. In such examples, the device (e.g., processor of the device) forwards the challenge to the battery management unit in the device. In some examples, in response to receiving the challenge, the battery management unit digitally signs the challenge, optionally with a private key (e.g., cryptographic key that is unique associated with the battery management unit and/or the battery). In some embodiments, the signature is encrypted using the private key. In some examples, the signed challenge is transmitted to the server. In some embodiments, the device transmits the request including the signed challenge back to the server. In some examples, the server determines, from the signed challenge, whether the signature matches the expected signature that is associated with the battery management unit and/or the battery. In some examples, determining whether the signature matches includes verifying the signature using a public key of the battery management unit and/or the battery. In some embodiments, using the public key includes decrypting the signature using the public key. In some examples, if verification using the public key is successful, then the server determines that the challenge was signed by the battery management unit (and/or the battery) and verifies that the battery management unit (and/or battery) is the battery management unit (and/or battery) that the device is requesting to be authenticated and/or verifies that the battery management unit (and/or battery) is installed in the device that is requesting authentication. In some examples, the battery management unit (and/or battery) signs the challenge itself and transmits the signed challenge back to the server (e.g., as opposed to generating a certificate). In some examples, the public key of the battery management unit and/or the battery and/or the predetermined signature associated with the battery management unit and/or the battery are stored in a database at the server at the time of manufacture (e.g., the global known components database). In some examples, an authorized manufacturer of the battery (battery management unit) is authorized to update the global known components database to add new entries when a new battery (or battery management unit) is manufactured and brought into circulation.

In some examples, as described above with respect to FIG. 3, after the server determines whether the one or more eligibility criteria are satisfied, the server transmits an indication of the results of the eligibility determination to the device. In some examples, the received indication indicates that the unique ID of the first component matches the expected unique ID stored at the server. Thus, in some examples, the expected unique ID database stored on the device is in error and does not match the expected unique ID stored at the server. In some examples, in response to determining that the device's expected unique ID database is in error, the device initiates a process to recover or restore its unique ID database. For example, the device transmits a request to the server, receives the proper entries for the expected ID database, and updates its expected ID database with the corrected entries. In some examples, if the received indication indicates that the unique ID does not match the expected unique ID (e.g., verifying that the first component is a newly installed component) and that the first component is eligible to be installed in the device, the device transmits a claim command to the server (e.g., to request formal association of the first component with the device). In some examples, the server does not transmit an indication of the results of the eligibility determination to the device. In such examples, the server performs the one or more authentication steps (e.g., as described with respect to FIG. 3 and FIG. 5) without requiring receipt of the claim command from the device.

In some examples, after the server performs one or more authentication steps, the device receives (410), from the server, an indication of the result of the authentication. In some examples, the indication of the result of the authentication includes a certificate associated with the first component. In some examples, the certificate includes one or more status codes, result codes, error codes, etc. In some examples, the certificate can indicate that the one or more eligibility criteria are satisfied. In some examples, the certificate can individually indicate that certain eligibility requirements are satisfied (e.g., that the installation counter has not exceeded a maximum amount). In some examples, the certificate can indicate that the association was successfully executed. In some examples, the certificate can indicate that the global expected identifier database was updated and/or that the installation counter has been updated. In some examples, in accordance with a determination that the indication (e.g., the certificate) indicates that the association was successfully authenticated, the device updates the entry of expected identifier database associated with the first component type with the unique identifier of the first component (412). Updating the entry indicates that the device has now associated the first component with the device, such that future initialization or boot-up sequences will not cause the device to detect a mismatch in the unique identifier. In some examples, updating the expected identifier database includes transmitting a request to a server to provide authorization/approval to update the expected identifier database. As described above, in some examples, the expected identification database cannot be updated or otherwise modified without express authorization/approval from an authorized authority (e.g., such as server 330). In some examples, in response to receiving authorization from the server, the device updates the expected identifier entry with the unique identifier of the first component.

In some examples, after the device updates the expected identifier for the first component that is stored at the device, then during subsequent initialization sequences (e.g., boot-up sequence, power-on sequences, etc.), the device can determine that the unique identifier of the first component matches the expected identifier (e.g., the next time the device performs method 400). Thus, unless or until another component has been replaced (e.g., installed, removed, etc.), device will not need to query the server to verify the installed components.

In some examples, in accordance with a determination that (or in response to a determination that) the indication indicates that the association was successfully authenticated, the device forgoes displaying an indication that the association of the first component with the electronic device was not successfully authenticated (412) (e.g., the device continues the device initialization processes and operates normally). In some examples, in accordance with a determination that the indication indicates that the association was not successfully authenticated, the device forgoes updating the entry of expected identifier database associated with the first component type with the unique identifier of the first component and displays an indication that the association of the first component with the electronic device was not successfully authenticated (414) (e.g., the device continues the device initialization processes and during the initialization process or after the initialization process has completed, displays an indication that the association was not successfully authenticated). As described above, in some examples, displaying the indication that the association was not successfully authenticated includes displaying a persistent or dismissible notification on the display of the device. In some examples, the displayed indication includes displaying a banner in a settings user interface. In some examples, the displayed indication indicates that the first component cannot be authenticated, could not be successfully associated with the device, may not be an authentic component and/or may not function properly.

In some examples, if the unique identifier of the first component matches the expected identifier, then the device determines that the first component is not a newly installed component or has not been replaced with another component. In some examples, in accordance with a determination that the unique identifier matches the expected identifier, then the device forgoes (416) displaying an indication that the association of the first component with the electronic device was not successfully authenticated and optionally forgoes updating the expected identifier for a component of the first component type.

In some examples, the device implements a reduced version of method 400. For example, if the device does not have access to the server (e.g., no internet access, etc.), the device can forgo performing one or more of the steps of method 400. In such examples, the device determines that the unique identifier of the first component does not match the expected identifier for a component of the first component type. In some examples, instead of transmitting a request to the server to authenticate the association (e.g., because the device is unable to contact the server), the device displays an indication that a new component (e.g., the first component) may have been installed and/or replaced and could not be authenticated, could not be successfully associated with the device, may not be an authentic component and/or may not function properly. In some examples, the displayed indication is displayed in a settings user interface and recommends to the user to take the device to a repair vendor. In other words, if the unique identifier does not match the expected identifier, the device can skip steps 408, 410, and 412 and perform step 414 as if the authentication was not successful.

FIG. 5 illustrates a method of authenticating an association of an installed component with an electronic device performed by a server according to examples of the disclosure. In some examples, method 500 is performed by a server, such as server 330 described above with respect to FIG. 3. At 502, the server receives a request, from a device (e.g., such as device 100), to authenticate an association of a first component of a first component type with the device.

In some examples, the server verifies that the first component is installed in the device (504). In some examples, the verification includes issuing a challenge to the electronic device to verify that the first component is installed on the electronic device. In some examples, installation is verified if the device returns, to the server, a challenge signed by the component or by the controller associated with the component. In some examples, step 504 is optional and the server does not issue a challenge to the device to verify that the first component is installed on the electronic device.

In some examples, in response to the request to authenticate the association of the first component with the electronic device and optionally in accordance with a determination that the first component is verified as installed in the electronic device, the server determines whether the first component satisfies one or more eligibility criteria. As described above, the server determines whether the first component is a known component (e.g., by looking up the unique identifier in a global known components database) and/or whether the first component has been installed more than a threshold number of times (e.g., by looking up the unique identifier in a global install counter and comparing it against the maximum number of installs). In some examples, in accordance with a determination that the one or more eligibility criteria are satisfied (e.g., the first component is eligible to be installed in the device) (506), the server authenticates the association of the first component with the electronic device (508), including updating (510) a global installation counter associated with the first component (e.g., by updating an entry in a global installation database associated with the first component's unique identifier), and updating (512) the expected identifier for a component of the first component type based on the unique identifier of the first component (e.g., by updating an entry in the global expected identifier database associated with the first component type for the device to reflect the first component's unique identifier).

In some examples, in accordance with a determination that the first component satisfies the one or more eligibility criteria (506) and before authenticating an association of the first component with the electronic device (508), the server transmits, to the device, an indication of the eligibility determination to the device. In some examples, the indication is a certificate and includes one or more status codes, error codes, etc. In some examples, the status codes and/or error codes indicate whether the first component is an authentic component, whether the first component is claimable (e.g., eligible to be installed into the device), etc. In some examples, after transmitting the indication to the device, the server receives, from the device, a claim command. In some examples, the claim command corresponds to a formal request to associate the first component with the device. In some examples, in response to the claim command, the server authenticates the association of the first component with the electronic device (e.g., continues method 500 to step 508). In some examples, the server does not transmit an indication of the results of the eligibility determination to the device. In such examples, the server performs the one or more authentication steps (e.g., step 508) without requiring receipt of the claim command from the device.

In some examples, after the first component is associated with the electronic device, the server transmits (514), to the electronic device, an indication that authentication of the association was successful. In some examples, after transmitting an indication that authentication of the association of the first component with the electronic device was successful, the electronic device optionally requests authorization to update the expected identification database stored on the electronic device. In some examples, in response to the request and in accordance with a determination that the association was successful and/or that the expected ID database stored on the server reflects the requested update from the device (e.g., that the unique ID that the device wants to update the device's expected ID with is the same as the expected ID that is stored at the expected ID database at the server), the server transmits an authorization to the electronic device to update the expected identification database stored on the electronic device. In some embodiments, the authorization includes a command or series of commands that, when performed by the processor of the device, allows the processor to cause the expected ID to be updated (e.g., which the processor would be unable to perform without the command from the server). In some examples, along with the authorization, the server transmits one or more entries of the expected identification database associated with the device to the electronic device (which reflect the updated association between the first component and the electronic device). In some examples, the electronic device receives the one or more entries and overwrites the existing entries in the expected identifier database stored on the electronic device with the received entries.

In some examples, if the first component does not satisfy the one or more eligibility criteria, then the server determines that the first component is not eligible to be installed in the device. In some examples, in accordance with a determination that the first component does not satisfy the one or more eligibility criteria, the server transmits, to the electronic device, an indication that the authentication of the association of the first component of the first component type with the electronic device was unsuccessful (516).

It is understood that although the above-described steps were described as being performed by a single server, any combination of the above-described steps can be performed by any number of servers. For example, a first server can perform steps 502-506, while a second server performs steps 508-516, and a third server performs the step of authorizing the electronic device to update its expected ID database. Thus, any combination of servers, sub-servers, subsystems, etc. can be used to perform the above-described steps.

Therefore, according to the above, some examples of the disclosure are directed to a method. In some examples, the method comprises determining, at an electronic device having a first component of a first component type, a unique identifier associated with the first component; determining that the unique identifier associated with the first component does not match an expected identifier of a component of the first component type in the electronic device, in accordance with the determination that the unique identifier does not match the expected identifier of the component of the first component type in the electronic device: determining that the first component associated with the unique identifier satisfies one or more eligibility criteria; in accordance with the determination that the first component associated with the unique identifier satisfies the one or more eligibility criteria, authenticating an association of the first component with the electronic device, including: updating an installation counter associated with the first component; and updating the expected identifier for the component of the first type based on the unique identifier of the first component.

In some examples, the method further comprises determining that a second component associated with a second unique identifier does not satisfy one or more eligibility criteria; and in accordance with the determination that the second component associated with the second unique identifier does not satisfy the one or more eligibility criteria, forgoing authenticating the association of the second component with the electronic device.

In some examples, the one or more eligibility criteria includes a requirement that a number of installations associated with the first component is not above a predetermined maximum number. In some examples, the predetermined maximum number is based on a location of the electronic device. In some examples, the one or more eligibility criteria includes a requirement that, if the first component was previously associated with the electronic device, the previous association of the first component with the electronic device was authenticated within a predetermined time of a current association of the first component with the electronic device.

In some examples, the expected identifier is stored in an expected identifier database, wherein the expected identifier database includes a plurality of entries corresponding to a plurality of expected identifiers for a plurality of component types associated with a plurality of electronic devices. In some examples, the expected identifier database is stored at a server and updating the expected identifier is performed at the server. In some examples, the expected identifier is stored in an expected identifier database, wherein the expected identifier database includes a plurality of entries corresponding to a plurality of expected identifiers for a plurality of component types associated with the electronic device. In some examples, the expected identifier database is stored at the electronic device and updating the expected identifier is performed at the electronic device. In some examples, the determination that the first component associated with the unique identifier satisfies the one or more eligibility criteria is performed at a server.

In some examples, the installation counter is stored at a server and updating the installation counter is performed at the server. In some examples, the method further includes in accordance with a determination that the first component associated with the unique identifier does not satisfy the one or more eligibility criteria, displaying, at the electronic device, an indication that the association of the first component with the electronic device has not been authenticated.

In some examples, the method further comprises after authenticating the association of the first component with the electronic device, determining, at a second electronic device, that the first component is installed in the second electronic device; after determining that the first component is installed in the second electronic device, determining that the installation count of the first component is above a predetermined maximum number; and in accordance with the determination that the installation count of the first component is above the predetermined maximum number, forgoing authenticating an association of the first component with the second electronic device.

In some examples, the method further comprises after authenticating the association of the first component with the electronic device, determining, at a second electronic device, that the first component is installed in the second electronic device; after determining that the first component is installed in the second electronic device, determining that the installation count of the first component is not above a predetermined maximum number; and in accordance with the determination that the installation count of the first component is not above the predetermined maximum number, authenticating an association of the first component with the second electronic device.

In some examples, the method further comprises after authenticating the association of the first component with the electronic device, initiating a process for powering on the electronic device; after initiating the process for powering on the electronic device, determining that the unique identifier of the first component matches the expected identifier of the component of the first component type in the electronic device; and in accordance with a determination that the unique identifier of the first component matches the expected identifier, continuing, at the electronic device, a process for initializing the electronic device without initializing a process for authenticating an association of the first component with the electronic device.

In some examples, the first component is a battery; and the unique identifier associated with the battery is provided to the electronic device by a battery management unit associated with the battery. In some examples, the method further includes in accordance with the determination that the unique identifier does not match the expected identifier of the component of the first component type in the electronic device, verifying that the first component is installed in the electronic device. In some examples, verifying that the first component is installed in the electronic device comprises: issuing, by a server, a request to the first component; and in response to receiving the request from the server, transmitting a response, to the server, signed by the first component.

In some examples, the method further comprises after authenticating the association of the first component with the electronic device, forgoing displaying an indication that the association of the first component with the electronic device has not been authenticated. In some examples, the installation counter associated with the first component is not associated with any other component of the first component type. In some examples, updating the installation counter associated with the first component includes incrementing the installation counter associated with the first component. In some examples, the installation counter cannot be decreased due to an association or de-association of the first component with a respective electronic device. In some examples, the association of the first component with the electronic device includes associating the unique identifier of the first component with a unique identifier of the electronic device. In some examples, the unique identifier of the electronic device is a unique identifier of a processor of the electronic device.

In some examples, the method further comprises determining, at the electronic device, that a third component of a third component type, different from the first component type, is installed in the electronic device; and continuing, at the electronic device, a process for initializing the electronic device without initializing a process for authenticating an association of the third component with the electronic device. In some examples, the method further comprises determining, at the electronic device, that a fourth component of a fourth component type, different from the first component type, is installed in the electronic device; and in response to a determination that the fourth component is installed in the electronic device, initializing a process for authenticating an association of the fourth component with the electronic device.

Some examples of the disclosure are directed to an electronic device. In some examples, the electronic device comprises one or more processors; memory; and one or more programs, wherein the one or more programs are stored in the memory and are configured for execution by the one or more processors. In some examples, the one or more programs comprising instructions for: determining a unique identifier associated with a first component installed in the electronic device; and in accordance with a determination that the unique identifier does not match an expected identifier of a component of the first component type in the electronic device: transmitting a request, to a server, to authenticate an association of the first component with the electronic device; after transmitting the request, receiving, from the server, an indication of a result of the authentication of the association of the first component with the electronic device; in accordance with a determination, based on the indication, that the authentication of the association of the first component with the electronic device was successful, updating an expected identifier of the component of the first component type; and in accordance with a determination, based on the indication, that the authentication of the association of the first component with the electronic device was not successful, forgoing updating the expected identifier of the component of the first component type.

In some examples, updating the expected identifier of the component of the first component type includes receiving, from the server, authorization to update the expected identifier of the component of the first component type, and updating the expected identifier of the first component type in response to receiving the authorization to update the expected identifier.

Some examples of the disclosure are directed to a non-transitory computer readable storage medium storing one or more programs configured for execution by one or more processors of an electronic device. In some examples, the one or more programs comprising instructions for: determining a unique identifier associated with the first component installed in the electronic device; and in accordance with a determination that the unique identifier does not match an expected identifier of a component of the first component type in the electronic device: transmitting a request, to a server, to authenticate an association of the first component with the electronic device; receiving, from the server, an indication of a result of the authentication of the association of the first component with the electronic device; in accordance with a determination, based on the indication, that the authentication of the association of the first component with the electronic device was successful, updating an expected identifier of the component of the first component type; and in accordance with a determination, based on the indication, that the authentication of the association of the first component with the electronic device was not successful, forgoing updating the expected identifier of the component of the first component type.

Some examples of the disclosure are directed to a server. In some examples, the server comprises one or more processors; memory; and one or more programs, wherein the one or more programs are stored in the memory and are configured for execution by the one or more processors. In some examples, the one or more programs comprises instructions for: receiving, from an electronic device, a request to authenticate an association of a first component of a first component type with the electronic device; in accordance with a determination that the first component satisfies one or more eligibility criteria, authenticating the association of the first component with the electronic device, including: updating an installation counter associated with the first component; and updating the expected identifier for a component of the first component type based on the unique identifier of the first component; and in accordance with a determination that the first component does not satisfy the one or more eligibility criteria, forgoing authenticating the association of the first component with the electronic device.

In some examples, the one or more programs further include instructions for transmitting, to the electronic device, an indication that authentication of the association of the first component of the first component type with the electronic device was successful. In some examples, the one or more programs further include instructions for verifying that the first component is installed in the electronic device. In some examples, verifying that the first component is installed in the electronic device comprises: transmitting, to the electronic device, a request to verify that the first component is installed in the electronic device; and receiving, from the electronic device, a challenge signed by the first component.

Some examples of the disclosure are directed to a non-transitory computer readable storage medium storing one or more programs configured for execution by one or more processors of a server. In some examples, the one or more programs comprising instructions for: receiving, from an electronic device, a request to authenticate an association of a first component of a first component type with the electronic device; in accordance with a determination that the first component satisfies one or more eligibility criteria, authenticating an association of the first component with the electronic device, including: updating an installation counter associated with the first component; and updating the expected identifier for a component of the first component type based on the unique identifier of the first component; and in accordance with a determination that the first component does not satisfy the one or more eligibility criteria, forgoing authenticating the association of the first component with the electronic device.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method, comprising:
    determining, at an electronic device having a first component of a first component type, a unique identifier associated with the first component;
    determining that the unique identifier associated with the first component does not match an expected identifier of a component of the first component type in the electronic device; and
    in accordance with the determination that the unique identifier does not match the expected identifier of the component of the first component type in the electronic device:
        determining that the first component associated with the unique identifier satisfies one or more eligibility criteria;
        in accordance with the determination that the first component associated with the unique identifier satisfies the one or more eligibility criteria, authenticating an association of the first component with the electronic device, including:
            updating an installation counter associated with the first component; and
            updating the expected identifier for the component of the first component type based on the unique identifier of the first component.

2. The method of claim 1, further comprising:
    determining that a second component associated with a second unique identifier does not satisfy one or more eligibility criteria; and
    in accordance with the determination that the second component associated with the second unique identifier does not satisfy the one or more eligibility criteria, forgoing authenticating the association of the second component with the electronic device.

3. The method of claim 1, wherein the one or more eligibility criteria includes a requirement that a number of installations associated with the first component is not above a predetermined maximum number.

4. The method of claim 3, wherein the predetermined maximum number is based on a location of the electronic device.

5. The method of claim 1, wherein the one or more eligibility criteria includes a requirement that, if the first component was previously associated with the electronic device, the previous association of the first component with the electronic device was authenticated within a predetermined time of a current association of the first component with the electronic device.

6. The method of claim 1, wherein the expected identifier is stored in an expected identifier database, wherein the expected identifier database includes a plurality of entries corresponding to a plurality of expected identifiers for a plurality of component types associated with a plurality of electronic devices.

7. The method of claim 6, wherein the expected identifier database is stored at a server and updating the expected identifier is performed at the server.

8. The method of claim 1, wherein the expected identifier is stored in an expected identifier database, wherein the expected identifier database includes a plurality of entries corresponding to a plurality of expected identifiers for a plurality of component types associated with the electronic device.

9. The method of claim 8, wherein the expected identifier database is stored at the electronic device and updating the expected identifier is performed at the electronic device.

10. The method of claim 9, wherein the expected identifier was issued by a trusted authority.

11. The method of claim 1, wherein the determination that the first component associated with the unique identifier satisfies the one or more eligibility criteria is performed at a server.

12. The method of claim 1, wherein the installation counter is stored at a server and updating the installation counter is performed at the server.

13. The method of claim 1, wherein the installation counter is stored in a certificate including the unique identifier and updating the installation counter is performed at the electronic device.

14. The method of claim 1, further comprising:
    in accordance with a determination that the first component associated with the unique identifier does not satisfy the one or more eligibility criteria, displaying, at the electronic device, an indication that the association of the first component with the electronic device has not been authenticated.

15. The method of claim 1, further comprising:
    after authenticating the association of the first component with the electronic device, determining, at a second electronic device, that the first component is installed in the second electronic device;
    after determining that the first component is installed in the second electronic device, determining that the installation counter of the first component is above a predetermined maximum number; and
    in accordance with the determination that the installation count of the first component is above the predetermined maximum number, forgoing authenticating an association of the first component with the second electronic device.

16. The method of claim 1, further comprising:
    after authenticating the association of the first component with the electronic device, determining, at a second electronic device, that the first component is installed in the second electronic device;
    after determining that the first component is installed in the second electronic device, determining that the installation counter of the first component is not above a predetermined maximum number; and
    in accordance with the determination that the installation count of the first component is not above the predetermined maximum number, authenticating an association of the first component with the second electronic device.

17. The method of claim 1, further comprising:
    in accordance with the determination that the unique identifier does not match the expected identifier of the component of the first component type in the electronic device, verifying that the first component is installed in the electronic device.

18. The method of claim 17, wherein verifying that the first component is installed in the electronic device comprises:
   issuing, by a server, a request to the first component; and
   in response to receiving the request from the server, transmitting a response, to the server, signed by the first component.

19. The method of claim 1, further comprising:
   after authenticating the association of the first component with the electronic device, forgoing displaying an indication that the association of the first component with the electronic device has not been authenticated.

20. The method of claim 1, wherein the installation counter associated with the first component is not associated with any other component of the first component type.

21. The method of claim 1, wherein updating the installation counter associated with the first component includes incrementing the installation counter associated with the first component.

22. The method of claim 1, wherein the installation counter cannot be decreased due to an association or de-association of the first component with a respective electronic device.

23. The method of claim 1, wherein the association of the first component with the electronic device includes associating the unique identifier of the first component with a unique identifier of the electronic device.

24. The method of claim 23, wherein the unique identifier of the electronic device is a unique identifier of a processor of the electronic device.

25. The method of claim 1, further comprising:
   determining, at the electronic device, that a third component of a third component type, different from the first component type, is installed in the electronic device; and
   continuing, at the electronic device, a process for initializing the electronic device without initializing a process for authenticating an association of the third component with the electronic device.

26. The method of claim 1, further comprising:
   determining, at the electronic device, that a fourth component of a fourth component type, different from the first component type, is installed in the electronic device; and
   in response to a determination that the fourth component is installed in the electronic device, initializing a process for authenticating an association of the fourth component with the electronic device.

27. An electronic device, comprising:
   one or more processors;
   memory; and
   one or more programs, wherein the one or more programs are stored in the memory and are configured for execution by the one or more processors, the one or more programs comprising instructions for:
   determining a unique identifier associated with a first component of a first component type installed in the electronic device; and
   in accordance with a determination that the unique identifier does not match an expected identifier of a component of the first component type in the electronic device:
      transmitting a request, to a server, to authenticate an association of the first component with the electronic device;
      after transmitting the request, receiving, from the server, an indication of a result of the authentication of the association of the first component with the electronic device;
      in accordance with a determination, based on the indication, that the authentication of the association of the first component with the electronic device was successful, updating an expected identifier of the component of the first component type; and
      in accordance with a determination, based on the indication, that the authentication of the association of the first component with the electronic device was not successful, forgoing updating the expected identifier of the component of the first component type.

28. The electronic device of claim 27, wherein updating the expected identifier of the component of the first component type includes receiving, from the server, authorization to update the expected identifier of the component of the first component type, and updating the expected identifier of the first component type in response to receiving the authorization to update the expected identifier.

29. A non-transitory computer readable storage medium storing one or more programs configured for execution by one or more processors of an electronic device, the one or more programs comprising instructions for:
   determining a unique identifier associated with a first component of a first component type installed in the electronic device; and
   in accordance with a determination that the unique identifier does not match an expected identifier of a component of the first component type in the electronic device:
      transmitting a request, to a server, to authenticate an association of the first component with the electronic device;
      receiving, from the server, an indication of a result of the authentication of the association of the first component with the electronic device;
      in accordance with a determination, based on the indication, that the authentication of the association of the first component with the electronic device was successful, updating an expected identifier of the component of the first component type; and
      in accordance with a determination, based on the indication, that the authentication of the association of the first component with the electronic device was not successful, forgoing updating the expected identifier of the component of the first component type.

30. A server, comprising:
   one or more processors;
   memory; and
   one or more programs, wherein the one or more programs are stored in the memory and are configured for execution by the one or more processors, the one or more programs comprising instructions for:
   receiving, from an electronic device, a request to authenticate an association of a first component of a first component type with the electronic device;
   in accordance with a determination that the first component satisfies one or more eligibility criteria, authenticating the association of the first component with the electronic device, including:
      updating an installation counter associated with the first component; and updating an expected identifier for a component of the first component type based on a unique identifier of the first component; and in accordance with a determination that the first component does not satisfy the one or more eligibility criteria, forgoing authenticating the association of the first component with the electronic device.

31. The server of claim 30, wherein the one or more programs further include instructions for transmitting, to the electronic device, an indication that authentication of the association of the first component of the first component type with the electronic device was successful.

32. The server of claim 30, wherein the one or more programs further include instructions for verifying that the first component is installed in the electronic device.

33. The server of claim 32, wherein verifying that the first component is installed in the electronic device comprises:
   transmitting, to the electronic device, a request to verify that the first component is installed in the electronic device; and
   receiving, from the electronic device, a challenge signed by the first component.

34. A non-transitory computer readable storage medium storing one or more programs configured for execution by one or more processors of a server, the one or more programs comprising instructions for:
   receiving, from an electronic device, a request to authenticate an association of a first component of a first component type with the electronic device;
   in accordance with a determination that the first component satisfies one or more eligibility criteria, authenticating an association of the first component with the electronic device, including:
      updating an installation counter associated with the first component; and
      updating an expected identifier for a component of the first component type based on a unique identifier of the first component; and
         in accordance with a determination that the first component does not satisfy the one or more eligibility criteria, forgoing authenticating the association of the first component with the electronic device.

35. The method of claim 1, further comprising:

after authenticating the association of the first component with the electronic device, initiating a process for powering on the electronic device;

after initiating the process for powering on the electronic device, determining that the unique identifier of the first component matches the expected identifier of the component of the first component type in the electronic device; and in accordance with a determination that the unique identifier of the first component matches the expected identifier, continuing, at the electronic device, a process for initializing the electronic device without initializing a process for authenticating an association of the first component with the electronic device.

36. The method of claim 1, wherein:

the first component is a battery; and the unique identifier associated with the battery is provided to the electronic device by a battery management unit associated with the battery.

* * * * *